(12) United States Patent
Gibson et al.

(10) Patent No.: US 12,149,271 B2
(45) Date of Patent: Nov. 19, 2024

(54) SYSTEM AND METHOD IMPLEMENTING SOFT-DECISION BASED EXCISION CANCELLATION TECHNOLOGY

(71) Applicant: L3Harris Technologies, Inc., Melbourne, FL (US)

(72) Inventors: L. Andrew Gibson, Riverton, UT (US); Christian Schlegel, Park City, UT (US); David M. Arnesen, West Jordan, UT (US)

(73) Assignee: L3HARRIS TECHNOLOGIES, INC., Melbourne, FL (US)

( * ) Notice: Subject to any disclaimer, the term of this patent is extended or adjusted under 35 U.S.C. 154(b) by 344 days.

(21) Appl. No.: 17/879,260

(22) Filed: Aug. 2, 2022

(65) Prior Publication Data

US 2024/0048165 A1    Feb. 8, 2024

(51) Int. Cl.
*H04B 1/10* (2006.01)
(52) U.S. Cl.
CPC .................... *H04B 1/1027* (2013.01)
(58) Field of Classification Search
CPC .............. H04B 1/1027; H04L 25/0328; H04L 25/03318
See application file for complete search history.

(56) References Cited

U.S. PATENT DOCUMENTS

| | | | |
|---|---|---|---|
| 6,188,718 B1 | 2/2001 | Gitlin et al. | |
| 6,804,309 B1 | 10/2004 | Morelos-Zaragoza | |
| 7,567,635 B2 | 7/2009 | Scheim et al. | |
| 8,433,015 B2 | 4/2013 | Downey et al. | |
| 8,929,492 B2 | 1/2015 | Downey et al. | |
| 9,130,624 B2 | 9/2015 | Daughtridge et al. | |
| 9,197,360 B2 | 11/2015 | Wyckoff | |

(Continued)

FOREIGN PATENT DOCUMENTS

| CN | 104507106 A | 4/2015 |
|---|---|---|
| CN | 103532894 B | 4/2017 |

OTHER PUBLICATIONS

Young Jin Chun et al, "Log-likelihood-ratio ordered successive interference cancellation in multi-user, multi-mode MIMO systems," IEEE Communications Letters, 11(11), pp. 837-839 (2008).

(Continued)

*Primary Examiner* — Nguyen T Vo
(74) *Attorney, Agent, or Firm* — Fox Rothschild LLP; Carol Thorstad-Forsyth (57) ABSTRACT

Systems and methods for mitigating the effect of in-band interference. The methods comprise: receiving a signal comprising at least one interfering signal component; generating a soft value for each symbol in at least one interfering signal component; and using the soft values to cancel at least one interfering signal component from the signal to mitigate the effect of interference. The soft value represents a most likely value for the symbol which is obtained by: determining a probability metric between an actual value of the symbol and each of a plurality of possible symbol values using a scaling value representing an estimate of the noise level in the signal received by the device; generating current local probabilities for the plurality of possible symbol values using the probability metric; and using the current local probabilities to determine the soft value.

20 Claims, 10 Drawing Sheets

(56) References Cited

U.S. PATENT DOCUMENTS

| | | |
|---|---|---|
| 9,197,461 B1 | 11/2015 | Sun et al. |
| 9,391,654 B2 | 7/2016 | Wyckoff et al. |
| 9,537,521 B2 | 1/2017 | Downey et al. |
| 9,537,689 B2 | 1/2017 | Zhou et al. |
| 9,794,092 B1 | 10/2017 | Isautier et al. |
| 9,967,021 B2 | 5/2018 | Potter et al. |
| 2004/0062317 A1 | 4/2004 | Uesugi et al. |
| 2005/0141628 A1 | 6/2005 | Cheng |
| 2005/0213556 A1 | 9/2005 | Wax et al. |
| 2006/0245509 A1 | 11/2006 | Khan et al. |
| 2009/0257477 A1 | 10/2009 | Khayrallah et al. |
| 2010/0098194 A1* | 4/2010 | Reial ............... H04L 25/067 375/348 |
| 2012/0189083 A1 | 7/2012 | Reial |
| 2013/0266095 A1* | 10/2013 | Jonsson ........... H03M 13/6337 375/340 |
| 2014/0044107 A1 | 2/2014 | Jacob |
| 2014/0198688 A1 | 7/2014 | Li et al. |
| 2014/0334579 A1* | 11/2014 | Lincoln ............. H04L 25/067 375/346 |
| 2015/0188573 A1 | 7/2015 | Lorca Hernando |
| 2015/0222391 A1 | 8/2015 | Webster et al. |
| 2016/0315754 A1 | 10/2016 | Wu et al. |
| 2017/0264391 A1* | 9/2017 | Kwon ................ H04L 1/0048 |

OTHER PUBLICATIONS

Ramkumar, "Automatic modulation classification for cognitive radios using cyclic feature detection," IEEE Circuits and Systems Magazine, 9(2), pp. 27-45 (2009).

Feng et al., "An Accurate Modulation Recognition Method of QPSK Signal," Advanced Techniques for Computational and Information Sciences, Mathematical Problems in Engineering, vol. 2015, Article ID 516081, 7 pages (2015).

Hazza et al., "An Overview of Feature-Based Methods for Digital Modulation Classification," 2013 1st International Conference on Communications, Signal Processing, and their Applications (ICCSPA) 6 pages (2013).

* cited by examiner

SYSTEM AND METHOD IMPLEMENTING SOFT-DECISION BASED EXCISION CANCELLATION TECHNOLOGY

STATEMENT OF THE TECHNICAL FIELD

The present document concerns communication systems. More specifically, the present document concerns systems and methods implementing excision and cancellation technology.

BACKGROUND

Description of the Related Art

There are many communication devices known in the art. Such communication devices include, but are not limited to, satellite communication devices and/or radios. The communication devices may experience interference resulting from other communication signals. This interference can degrade performance of the communication devices.

Summary

This document concerns systems and methods for mitigating the effect of interference. The methods comprise performing the following operations by a device: receiving a signal comprising interfering signal component(s); generating a soft value for each symbol in the interfering signal component(s); and using the soft value(s) to cancel the interfering signal component(s) from the signal to mitigate the effect of interference. Each soft value represents a most likely value for a symbol which is obtained by computing a probabilistic average of said symbols. This is done by: determining the difference between an actual value of the symbol and each of a plurality of possible symbol values using a scaling value representing an estimate of the noise level in the received signal.

In some scenarios, the methods also comprise scaling each symbol of the interfering signal component(s) and/or removing sign bit(s) from the symbol(s), prior to when the soft value(s) is(are) generated. This is done primarily to reduce the computational complexity of probability computations required in the soft symbol generation. The scaling may comprise combining each symbol with a scaling value. The scaling value may be generated by: performing hard symbol decoding to generate a hard symbol value for the symbol first; determining a measure of the noise variance in the signal received by the device using the hard symbol value; and using the measure of noise variance to derive the scaling value. The measure of noise variance may be determined by subtracting the hard symbol value by the actual symbol value. The scaling value may be derived by: generating an estimate for the noise power in the received signal by the device based on the measurements of the noise variance; and computing a running average of the estimated noise power over a given period of time. The estimated noise power may be generated by squaring a difference between the hard symbol value by the actual symbol value.

In those or other scenarios, a probability metric is defined mathematically by the equation $\exp((-|y_j - x_j|^2)/2\sigma^2)$, $y_j$ is a y-coordinate value for a possible signal point in a constellation, $x_j$ is an x-coordinate value for the possible signal point in the constellation, and $\sigma^2$ is the noise power estimate acting as the scaling value. Each of the current local probabilities is generated by dividing the probability metric by the sum of all the probability metrics. Each soft value is determined by: respectively multiplying each possible symbol value by a respective one of the current local probabilities to produce a value and (ii) computing a sum of these values.

The implementing system can comprise a processor and a non-transitory computer-readable storage medium comprising programming instructions that are configured to cause the processor to implement a method for mitigating interference. Alternatively or additionally, the implementing system may include logic circuits (e.g., subtractors, adders, multipliers, etc.), passive circuit components (e.g., resistors, capacitors, switches, delays, etc.) and/or other active circuit components (e.g., transistors, demodulators, modulators, combiners, etc.).

BRIEF DESCRIPTION OF THE DRAWINGS

This disclosure is facilitated by reference to the following drawing figures, in which like numerals represent like items throughout the figures.

DETAILED DESCRIPTION

It will be readily understood that the solution described herein and illustrated in the appended figures could involve a wide variety of different configurations. Thus, the following more detailed description, as represented in the figures, is not intended to limit the scope of the present disclosure, but is merely representative of certain implementations in various different scenarios. While the various aspects are presented in the drawings, the drawings are not necessarily drawn to scale unless specifically indicated.

Reference throughout this specification to features, advantages, or similar language does not imply that all of the features and advantages that may be realized should be or are in any single embodiment of the invention. Rather, language referring to the features and advantages is understood to mean that a specific feature, advantage, or characteristic described in connection with an embodiment is included in at least one embodiment of the present invention. Thus, discussions of the features and advantages, and similar language, throughout the specification may, but do not necessarily, refer to the same embodiment.

Interference cancellation tools are generally limited in their ability to perform effective excision of interference with power levels similar to the Signal Of Interest (SOI). The region where the interferer cannot be effectively excised, defined as the ratio of interferer power to SOI power, is called the deadzone. By updating existing excision tool sets in a modular core with novel algorithms and architectures of the present solution, the deadzone can be reduced or altogether eliminated. In some scenarios, signals are removed at similar power levels to the SOI with the deadzone of 2 dB or less.

The present solution provides systems and methods for mitigating the effect of interference. The methods comprise: receiving a signal comprising interfering signal component(s); generating a soft value for each symbol in the interfering signal component(s); and using the soft value(s) to cancel the interfering signal component(s) from the signal to mitigate the effect of interference. Each soft value represents the statistically best estimate for a symbol. A statistically best estimate is that estimate, which, observed over many instances, causes the least average interference when used for cancelation. This estimate is obtained by: determining a difference between an actual value of the symbol and each of a plurality of possible symbol values using a scaling value representing an estimate of a noise level in the received signal; generating current local probabilities for the possible symbol values using the probability metrics; and using the current local probabilities to determine the soft value.

In some scenarios, the methods also comprise scaling each symbol of the interfering signal component(s) and/or removing sign bit(s) from the symbol(s), prior to when the soft value(s) is(are) generated. The scaling may comprise combining each symbol with a scaling value. The scaling value may be generated by: performing hard symbol decoding to generate a hard symbol value for the symbol; determining a measure of noise variance in the signal received by the device using the hard symbol value; and using the measure of noise variance to derive the scaling value. The measure of noise variance may be determined by comparing the hard symbol value by the actual symbol value. The scaling value may be derived by: generating an estimated noise power for the signal received by the device based on the measure of noise variance; and computing a running average of the estimated noise power over a given period of time. The estimated noise power may be generated by squaring a product from the difference of the hard symbol value by the actual symbol value.

In those or other scenarios, the probability metric is defined by the mathematical equation $\exp((-|y_j-x_j|^2)/2\sigma^2)$, $y_j$ is a y-coordinate value for a possible signal point in a constellation, $x_j$ is an x-coordinate value for the possible signal point in the constellation, and $\sigma^2$ is the noise power estimate acting as the scaling value. Each of the current local probabilities is generated by dividing the probability metric by the sum of all the probability metrics. Each soft value is determined by: respectively multiplying each possible symbol value by a respective one of the current local probabilities to produce a value and (ii) computing a sum of the values.

Figure 1:
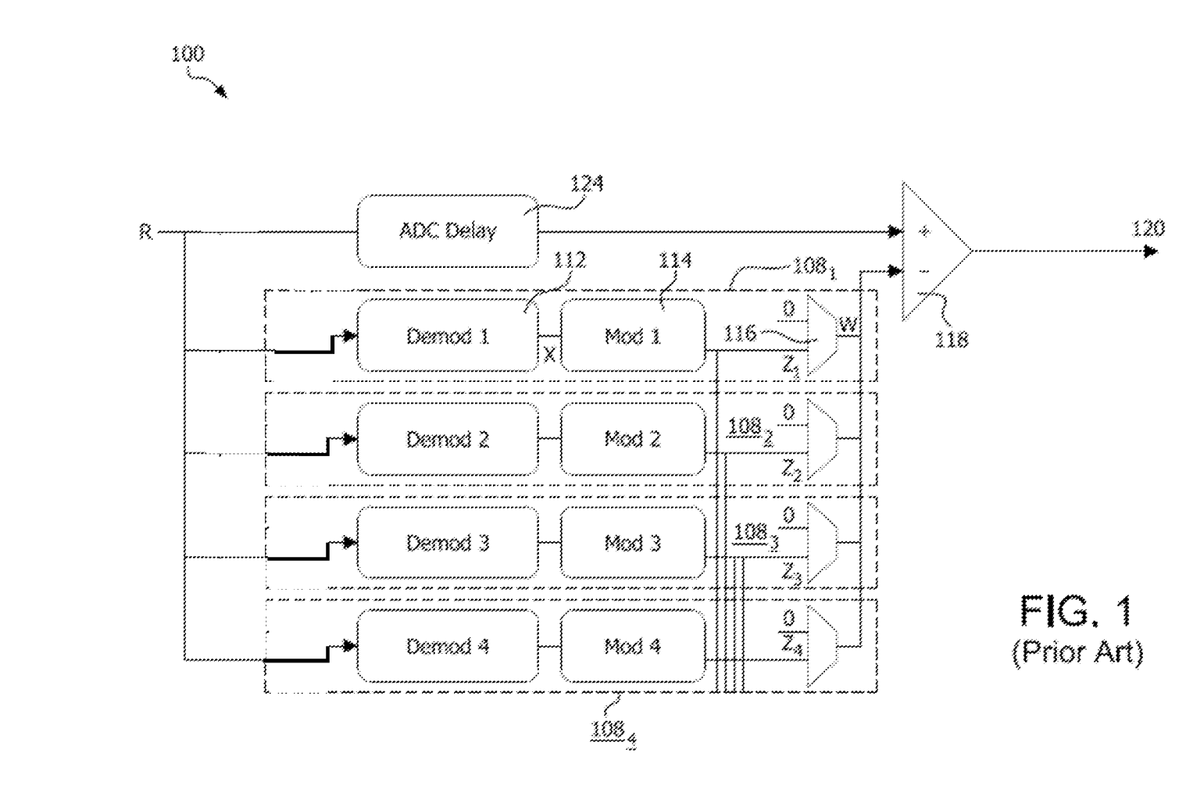
FIG. 1 is an illustration of an architecture for a conventional interference cancellation device. During operations of the conventional interference cancellation device, signals are either removed in parallel or via feedback.

An illustrative architecture 100 for a conventional interference cancellation device is shown in FIG. 1. Device 100 is generally configured to cancel or otherwise remove undesired signals from a received signal R so as to obtain an SOI. The undesired signals can include, but are not limited to, signals which unintentionally and/or intentionally introduce interference into a communication channel (e.g., a satellite communication channel). The desired and undesired signals overlap each other, and thus simply filtering the undesired signals cannot isolate the desired signal. Instead, the undesired signals must be extracted or otherwise removed from the received signal R to obtain the desired signal.

During operations, the received signal R is provided to the interference cancellation device 100. The interference cancellation device 100 performs operations to identify and reproduce each interfering component signal $Z_1$, $Z_2$, $Z_3$, $Z_4$ contained in the received signal R. The interfering component signals can include, but are not limited to, noise signal(s) and/or structured signal(s) (e.g., non-intentional interfering communication signals and/or jamming signals that intentionally introduce interference into a communication channel). These operations are implemented via a plurality of parallel Demodulator-Remodulator (D-R) engines $108_1$, $108_2$, $108_3$, $108_4$ (collectively referred to herein as "108"). Each D-R engine is generally configured to demodulate the interfering component signal (with relatively strong power levels) and reconstruct the interfering component signal would look like if it had not been overlapping the other component signals.

Each D-R engine comprises a demodulator 112 and a modulator 114. A signal Y is provided as an input to the demodulator 112. The signal Y can include the received signal R. The D-R engines may operate in a sequential manner such that component signals $Z_1$, $Z_2$, $Z_3$ and $Z_4$ are recursively extracted from the received signal R. As such, the input to the first D-R engine $108_1$ is R, while the input to the second D-R engine $108_2$ is R-$Z_1$. The input to the third D-R engine $108_3$ is R-$Z_1$-$Z_2$. The input to the fourth D-R engine $108_4$ is R-$Z_1$-$Z_2$-$Z_3$. Multiplexers 116 and combiner 118 facilitate this recursive signal extraction process. The SOI 120 is obtained and output once all component signal Z to $Z_4$ have been subtracted or otherwise removed from the received signal R.

Demodulators and modulators are well known. Still, it should be understood that demodulator 112 comprises an electronic circuit and/or computer program that is (are) configured to separate information that was modulated onto a carrier wave from the carrier wave itself. The output hard symbol decisions X of the demodulator 112 are passed to the modulator 114. The modulator 114 performs operations to vary one or more properties of a waveform using the hard symbol decisions X to produce a waveform $Z_1$, $Z_2$, $Z_3$ or $Z_4$. The waveform $Z_1$, $Z_2$, $Z_3$ or $Z_4$ is passed to a combiner 118, where it is subtracted or otherwise removed from the received signal R.

Notably, the above described conventional interference cancellation device 100 suffers from certain drawbacks. For example, the interference cancellation device 100 is unable to extract interference components from a received signal which have power levels similar to and/or lower than that of the SOI. Thus, the present solution was derived to address this drawback (e.g., remove undesired signals with relatively low power levels). Specifically, the present solution is designed to reduce the deadzone by implementing architectural changes and algorithm changes within an interference cancellation device. The architectural changes include a look-up table-based architecture, and the algorithm changes involve replacing hard symbol decision operations of the demodulators with soft symbol decision operations.

The use of soft cancelation instead of hard cancelation improves the algorithm performance for deadzone and interfering signal removal. In hard cancelation, a receiver determines the symbol sequence of an interferer, if its modulation form can be identified. These symbols are then utilized to rebuild the interfering signal together with knowledge of the signal waveform of the interferer, its carrier and time frequency, and its carrier and timing phases. These auxiliary parameters need to be estimated separately.

In soft cancellation, the system recognizes the fact that estimating the symbol sequence of an interferer may only be partially possible, and that such symbol sequence may have a high rate of errors. Thus, the system uses a probabilistic approach to estimate soft symbols by calculating the probability of each of the symbols being present in the interfering signal. From this, the system computes a statistically best estimate which is used to rebuild the interfering signal instead. It has been shown that this process produces better estimates of the signal to cancel than the hard decision symbol estimate approach employed by the conventional system of FIG. 1.

Figure 2:
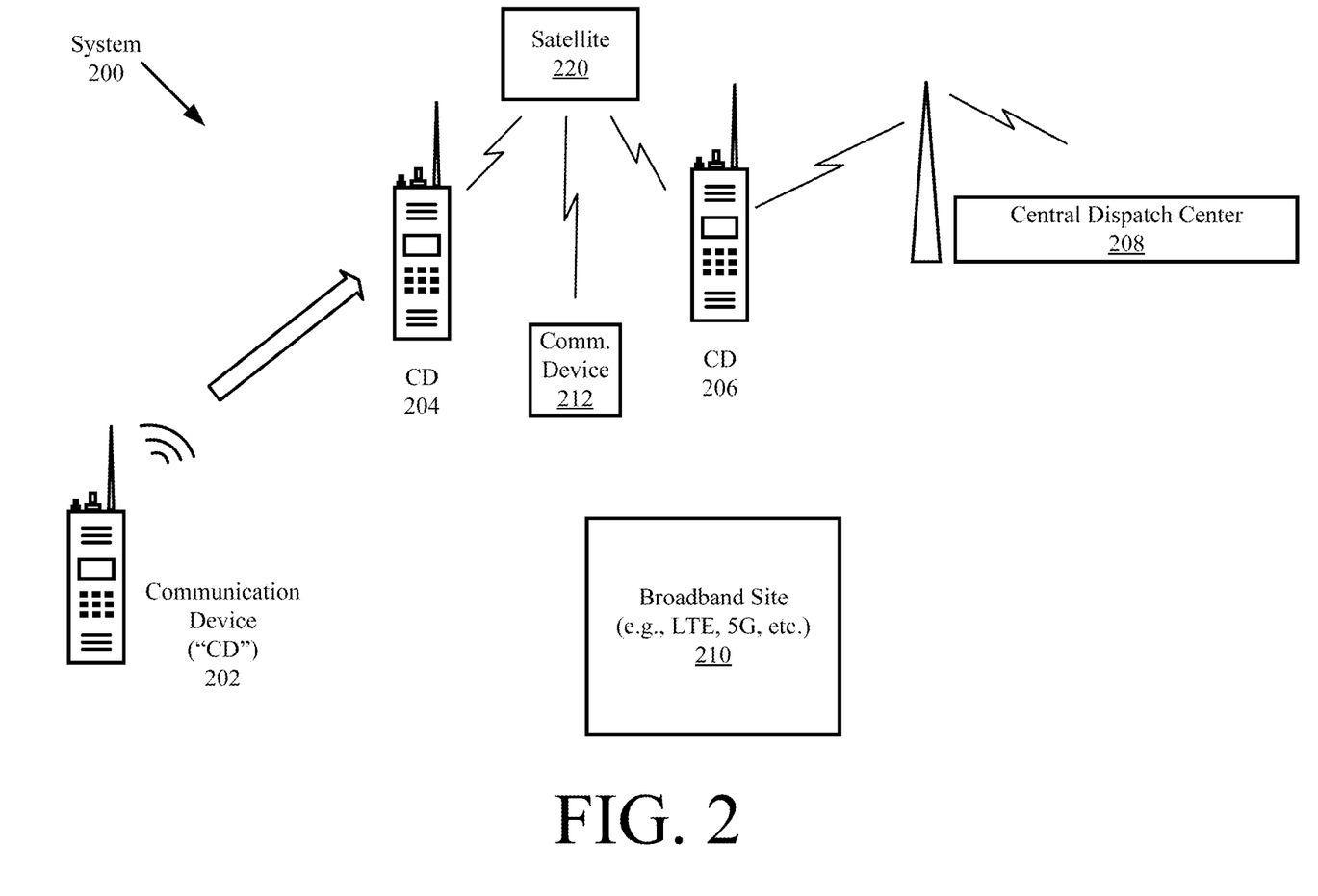
FIG. 2 is an illustration of a system implementing the present solution.

This document generally concerns novel systems and methods for operating a communication device so as to cancel interference to a receiver. An illustrative system 200 implementing the present solution is shown in FIG. 2. System 200 comprises a plurality of communication devices 202, 204, 206, a Central Dispatch Center (CDC) 208, a broadband site 210, and satellites 220, 222. The communication devices 202-206 include, but are not limited to, a portable radio, a fixed radio with a static location, a smart phone, a ground station, and/or a base station. The broadband site 210 includes, but is not limited to, an LMR site, a 2G cellular site, a 3G cellular site, a 4G cellular site, and/or a 5G cellular site. CDC 208 and broadband site 210 are well known in the art, and therefore will not be described herein.

During operation of system 200, the signals at the satellite 220 need processing in accordance with the present solution since that is where interference is occurring. The primary scenario is that where communication devices all point to the sky, possibly to different satellites 220 and 222, but that unwanted signals impinge on satellite 220. In secondary scenarios, interference may be caused by other source such as the broadband site 210.

As shown in FIG. 2, signals are communicated between the communication devices 202-206, between one or more communication devices 204, 206, 212 and the satellite 220, and/or between one or more communication devices 206 and the CDC 208. For example, communication device 202 communicates a signal to communication device 204, communication devices 204-206 communicate signals to satellite 220, and CDC 208 communicates a signal to communication device 206. Communication devices 204 and 206 perform operations to mitigate interference caused by the broadband site 210 on a given RF communication channel and/or other communication device 212 on a satellite communication channel. The manner in which communication devices 204 and 206 mitigate the interference to signals will become evident as the discussion progresses.

Figure 3:
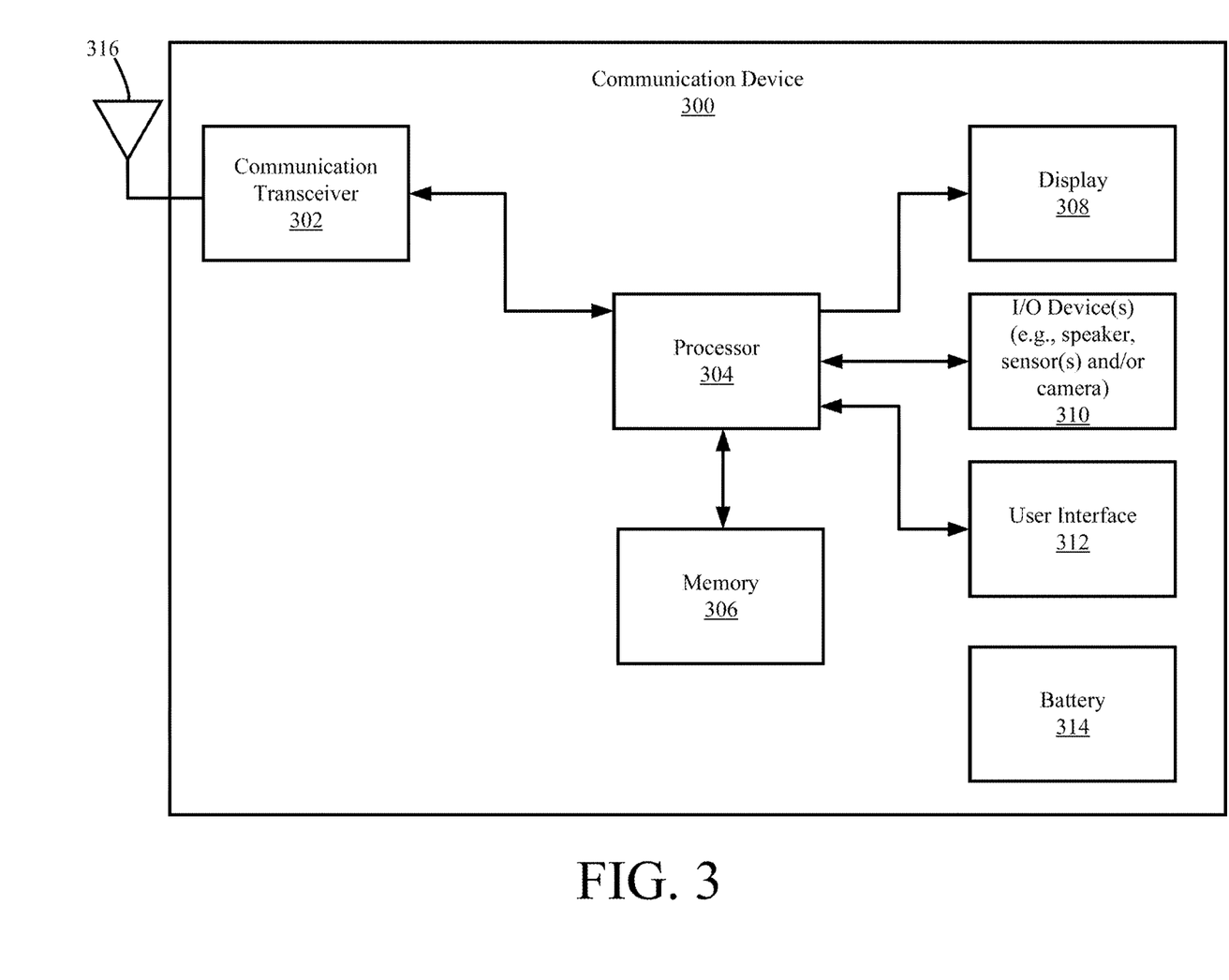
FIG. 3 is an illustration of a communication device architecture.

Referring now to FIG. 3, there is provided an illustration of an example architecture for a communication device 300 which is configured for carrying out the various methods described herein for mitigating the signal interference. Communication devices 202-206 of FIG. 2 are the same as or similar to communication device 300. As such, the discussion provided below in relation to communication device 300 is sufficient for understanding communication devices 202-206 of FIG. 2. Communication device 300 can include more or less components than that shown in FIG. 3 in accordance with a given application. For example, communication device 300 can include one or both components 308 and 310. The present solution is not limited in this regard.

As shown in FIG. 3, the communication device 300 comprises a communication transceiver 302 coupled to an antenna 316. The LMR communication transceiver can comprise one or more components such as a processor, an application specific circuit, a programmable logic device, a digital signal processor, or other circuit programmed to perform the functions described herein. The communication transceiver 302 can enable end-to-end communication services in a manner known in the art. In this regard, the communication transceiver can facilitate communication of data (e.g., voice data and/or media content) from the communication device 300 over a network and/or communications channel (e.g., a satellite communication channel).

The communication transceiver 302 can include, but is not limited to, a radio transceiver, a satellite transceiver, and/or a cellular network communication transceiver. The communication transceiver 302 is connected to a processor 304 comprising an electronic circuit. During operation, the processor 304 is configured to control the communication transceiver 302 for providing communication services. The processor 304 also facilitates mitigation of interference to signals. The manner in which the processor facilitates interference mitigation will become evident as the discussion progresses.

A memory 306, display 308, user interface 312 and Input/Output (I/O) device(s) 310 are also connected to the processor 304. The processor 304 may be configured to collect and store data generated by the I/O device(s) 310 and/or external devices (not shown). The I/O device(s) 310 can include, but are not limited to, a speaker, a microphone, sensor(s) (e.g., a temperature sensor and/or a humidity sensor), and/or a camera. Data stored in memory 306 can include, but is not limited to, one or more look-up tables or databases which facilitate selection of communication groups or specific communication device. The user interface 312 includes, but is not limited to, a plurality of user depressible buttons that may be used, for example, for entering numerical inputs and selecting various functions of the communication device 300. This portion of the user interface may be configured as a keypad. Additional control buttons and/or rotatable knobs may also be provided with the user interface 312. A battery 314 or other power source may be provided for powering the components of the communication device 300. The battery 300 may comprise a rechargeable and/or replaceable battery. Batteries are well known in the art, and therefore will not be discussed here.

The communication device architecture shown in FIG. 3 should be understood to be one possible example of a communication device system which can be used in connection with the various implementations disclosed herein. However, the systems and methods disclosed herein are not limited in this regard and any other suitable communication device system architecture can also be used without limitation. Applications that can include the apparatus and systems broadly include a variety of electronic and computer systems. In some scenarios, certain functions can be implemented in two or more specific interconnected hardware modules or devices with related control and data signals communicated between and through the modules, or as portions of an application-specific integrated circuit. Thus, the illustrative system is applicable to software, firmware, and hardware implementations.

Figure 4:
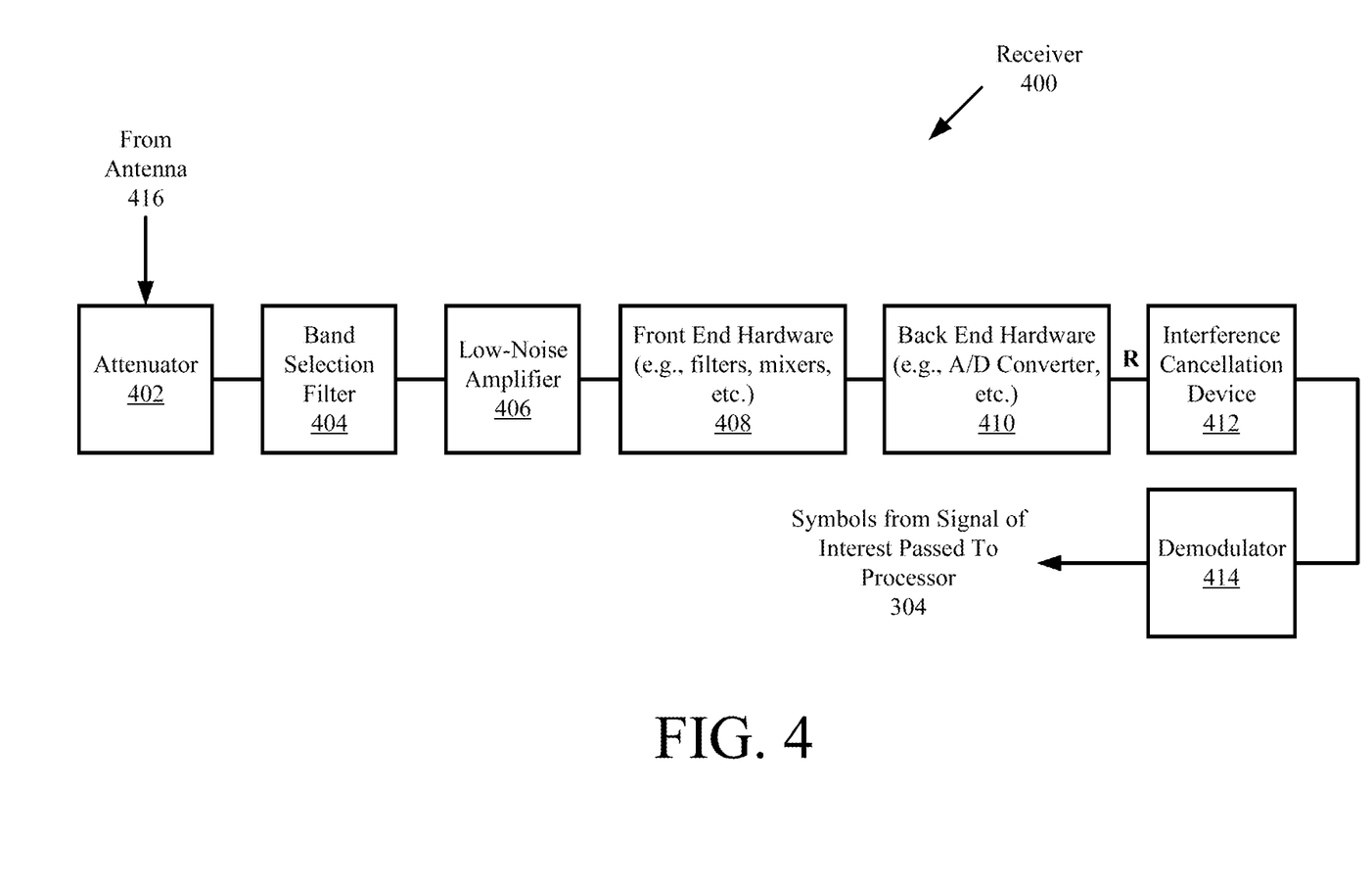
FIG. 4 is an illustration of a receiver architecture.

Referring now to FIG. 4, there is provided a more detailed illustration of an illustrative receiver portion 400 of the communication transceiver 302. Receiver 400 comprises an attenuator 402, a band selection filter 404, a Low-Noise Amplifier (LNA) 406, front end hardware 408, back-end hardware 410, an interference cancellation device 412 and a demodulator 414. Each of the listed devices 402-410 and 414 is known in the art, and therefore will not be described herein. The interference cancellation device 412 implements the present solution and is generally configured to remove interfering signals from received signals. The resulting signal is passed from the interference cancellation device 412 to the demodulator so that, for example, symbols can be extracted therefrom. The manner in which the signal interference is canceled or otherwise removed from received signals will become evident as the discussion progresses.

Figure 5:
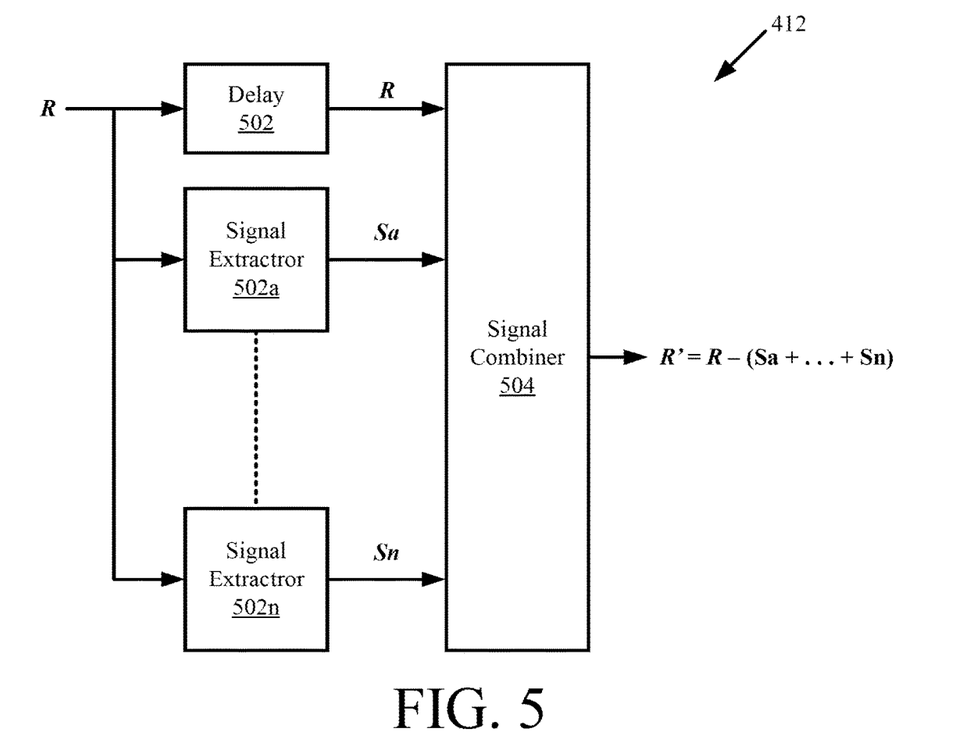
FIG. 5 shows an illustrative architecture for an interference cancellation device implementing a soft symbol decision approach of the present solution for mitigating interference.

Referring now to FIG. 5, there is provided an illustrative architecture for the interference cancellation device 412. The architecture of FIG. 5 may be cascaded. The interference cancellation device 412 comprises a delay 502, signal extractors 502a, . . . , 502n and a signal combiner 504. Each signal extractor is generally configured to excise or otherwise extract an interference signal component from the received signal R. The sum of the interference signal components Sa, . . . , Sn is then subtracted from the delayed received signal R at the signal combiner 504 to produce a signal R' representing the SOI.

Figure 6:
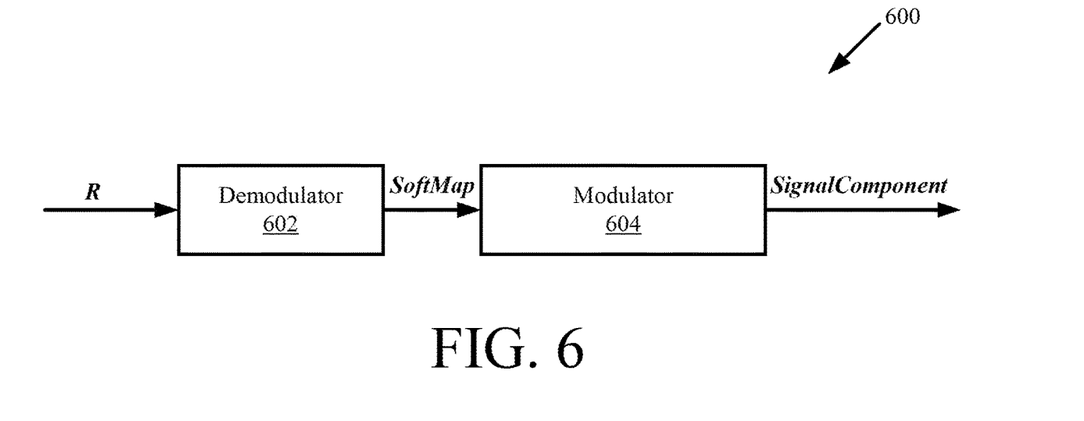
FIG. 6 shows an illustrative architecture for a signal extractor.

An illustrative architecture 600 for a signal extractor is shown in FIG. 6. Each signal 502a, . . . , 502n of FIG. 5 can be the same as or similar to signal extractor 600. Thus, the discussion of signal extractor 600 is sufficient for understanding signal extractors 502a, . . . , 502n of FIG. 5.

As shown in FIG. 6, signal extractor 600 comprises a demodulator 602 and a modulator 604. Demodulator 602 comprises an electronic circuit and/or computer program that is(are) configured to separate information that was modulated onto a carrier wave from the carrier wave itself. In this regard, the demodulator 602 receives a signal R and generates softvalue(s) SoftMap for symbols of a given signal component contained therein. The softvalue(s) SoftMap are passed to the modulator 604. The modulator 604 performs operations to vary one or more properties of a waveform to produce a waveform representing the signal component (e.g., an interfering signal).

Figure 7:
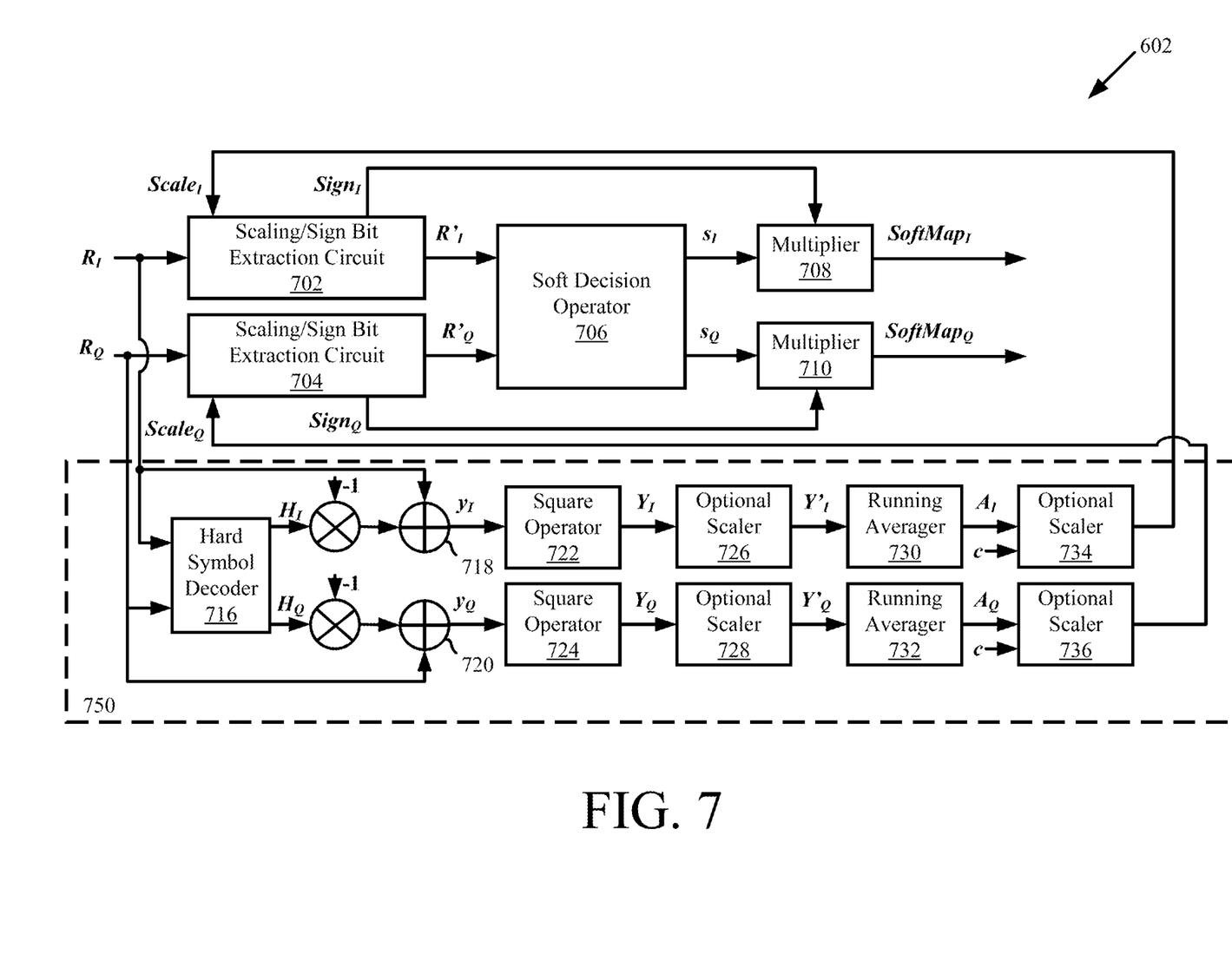
FIG. 7 shows a more detailed diagram of a soft decision portion of the demodulator shown in FIG. 6.

An illustrative architecture for a soft decision portion of the demodulator 602 is provided in FIG. 7. The demodulator 602 is generally configured to perform soft decision decoding in which a most likely value is determined for each symbol contained in a given signal component (e.g., an interfering signal). The soft decision decoding provides better estimates of original data than the hard decision decoding employed in conventional solutions such as that described above in relation to FIG. 1. The demodulator 602 is described below in relation to scenarios in which each symbol comprises a complex number with an I component and a Q component. The present solution is not limited in this regard. Operations of the demodulator 602 are clocked at a rate at which a source is transmitting the symbols in a carrier wave.

As shown in FIG. 7, the soft decision portion of the demodulator 602 comprises scaling/sign bit extraction circuits 702, 704, a soft decision operator 706 and multipliers 708, 710, 718, 720. The demodulator 602 may also comprise additional components not shown in FIG. 7. The additional components can include, but are not limited to, a matched filter, a carrier tracking component, a timing tracking component, and a signal scaling component. The additional components may precede the input symbol data $R_I$ and input symbol data $R_Q$. Circuit 702 is configured to optionally scale (e.g., reduce the size of) the input symbol data $R_I$, and extract or otherwise remove sign bit(s) from the symbol data $R_I$. Similarly, circuit 704 is configured to optionally scale (e.g., reduce the size of) the input symbol data $R_Q$ and extract or otherwise remove sign bit(s) from the symbol data $R_Q$. The operations of circuits 702, 704 may be performed to increase the computational efficiency and/or decrease the computational complexity of operations performed by the soft decision operator 706. The scaling of the input symbol data $R_I$ and $R_Q$ can be achieved by, for example, multiplying the symbol data $R_I$ by a value $Scale_I$ (e.g., N/64) and multiplying the symbol data $R_Q$ by a value $Scale_Q$ (e.g., N/64). The outputs R'I and R'Q of circuits 702, 704 are passed to the soft decision operator 706, and the sign bit values $Sign_I$ and $Sign_Q$ are respectively passed to multipliers 708, 710 downstream from the soft decision operator 706. The multipliers 708, 710 perform operations to combine the sign bit values with the outputs s1, s2 of the soft decision operator 706 to produce soft symbol values $SoftMap_I$, $SoftMap_Q$. The soft symbol values $SoftMap_I$, $SoftMap_Q$ are passed to the modulator 604 of FIG. 6.

The scaling values $Scale_I$ and $Scale_Q$ are determined via branch 750. The scaling value Scale represents an estimate of the noise level in the received signal R. In this regard, branch 750 comprises a hard symbol decoder 716, combiners 718, 720, square operators 722, 724, optional scalers 726, 728, 734, 736 and running averagers 730, 732. The hard symbol decoder 716 performs hard decision decoding to determine hard bit values for input symbol data $R_I$ and $R_Q$. Each hard bit value is a one or a zero. The hard symbol decision decoding can be achieved by comparing voltages of the input symbol data to threshold values. If the voltage is greater than the threshold value, then the bit is decoded as a one. Otherwise, the bit is decoded as a zero.

The hard symbol values $H_I$ and $H_Q$ are passed to adders 718, 720 where they are respectively subtracted from the input symbol data $R_I$, $R_Q$ to generate $y_I$, $y_Q$. $y_I$ represents a difference between hard symbol value $H_I$ and input symbol data $R_I$. $y_Q$ represents a difference between hard symbol value $H_Q$ and input symbol data $R_Q$. If the hard symbol decisions are correct, then $y_I$, $y_Q$ indicates a measure of a noise variance in the received signal R. The scaling values $Scale_I$, $Scale_Q$ are derived from the measure of noise variance. More specifically, $y_I$ and $y_Q$ are squared by square operator 722, 724 to produce estimates of the noise power $Y_I$, $Y_Q$ (i.e., $Y_I=(y_I)^2$ and $Y_Q=(y_Q)^2$). The noise power estimates $Y_I$, $Y_Q$ may be optionally scaled in blocks 726, 728, and/or used in blocks 730, 732 to compute running averages $A_I$, $A_Q$ for the noise power in the received signal R. The running averages may optionally be scaled in blocks 734, 736. The running averages $A_I$, $A_Q$ (scaled or unscaled) are then used as $Scale_I$, $Scale_Q$.

At the soft decision operator 706, operations are performed using R'I and R'Q to determine a probability that a symbol in a signal component has a given symbol value in a set of possible symbol values (e.g., 8 possible symbols in 8PSK). These operations are repeated for each possible symbol value in the set. Once the probabilities are determined, the statistical average of all possible symbols is selected as the soft symbol value $s_I$, $s_Q$. The manner in which the probabilities are determined will become more evident as the discussion progresses.

Figure 8:
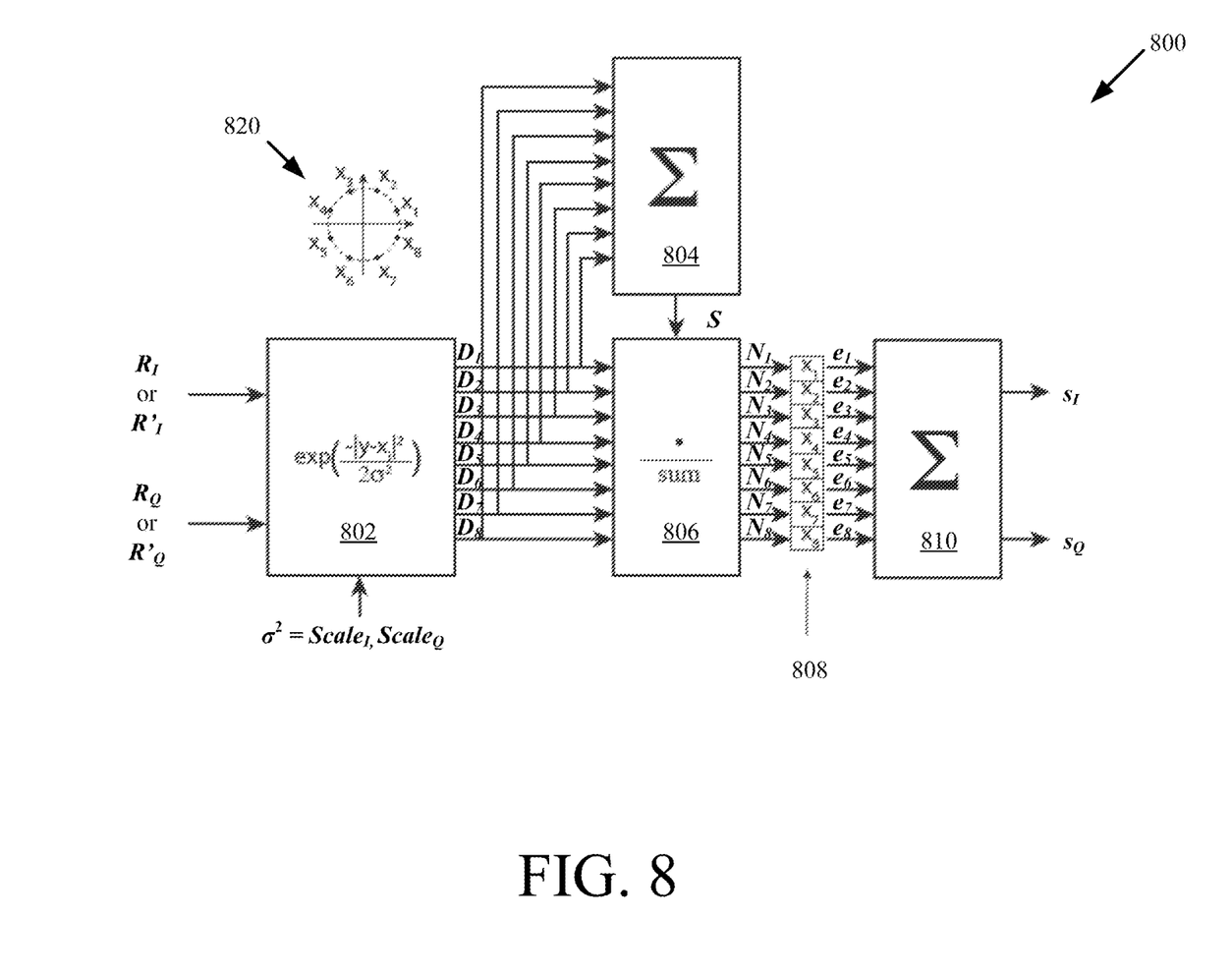
FIGS. 8-9 each shows an illustrative architecture for a look-up table operator.

Referring now to FIG. 8, there is provided a detailed block diagram of an illustrative architecture for a soft decision operator 800. Soft decision operator 706 of FIG. 7 can be the same as or similar to soft decision operator 800. Thus, the discussion of soft decision operator 800 is sufficient for understanding operations of soft decision operator 706 of FIG. 7. Soft decision operator 800 is discussed below in relation to an 8PSK scenario. The present solution is not limited in this regard. The architecture of FIG. 8 can be modified for use in other modulation type scenarios (e.g., 16PSK, etc.).

Soft decision operator 800 is generally configured to determine a difference between an input signal symbol and each possible symbol value. In an 8PSK scenario, there are 8 possible symbol values $X_1, X_2, X_3, X_4, X_5, X_6, X_7, X_8$ as shown by constellation 820. Each symbol is encoded as a different phase of the carrier sine wave: 0°, 45°, 90°, 135°, 180°, 225°, 270° and 315°. The difference represents a phase difference between the input signal symbol and a given possible symbol phase. This operation is performed in block 802 and a probability metric can be defined by the following mathematical equation (1).

$$Dj = \exp((-y_j - x_j|^2)/2\sigma^2) \quad (1)$$

where Dj represents the probability metric of a possible symbol value (e.g., $X_1, X_2, X_3, X_4, X_5, X_6, X_7$ or $X_8$), given the input signal $y_j$; j is an integer (e.g., 1, 2, ..., or 8), y denotes the inphase and quadrature components of the received signal, and $x_j$ is the inphase/quadrature coordinate pair for the possible signal point in the constellation, while $\sigma^2$ is the scaling value defined by Scale$_I$ and Scale$_Q$.

The probability metrics Dj are then passed to blocks 804 and 806 for normalizing the same and computing symbol probabilities. The normalization is achieved by (i) computing a sum of the difference values in block 804 and (ii) dividing each difference value by the sum in block 806. The normalization operations can be defined by the following mathematical equations (2) and (3).

$$S = D1 + D2 + \ldots + Dj \quad (2)$$

$$Nj = Dj/S \quad (3)$$

where S represents the sum of the different values and Nj represents a probability of a possible signal value.

Once the current local probabilities have been determined, they are then used to generate a soft estimate of the symbol which was transmitted. The soft estimate is generated by (i) respectively multiplying each possible symbol value by the current local probabilities in block(s) 808 to produce values $e_j$ and (ii) computing a sum of the values to produce the soft estimate $s_I, s_Q$ (collectively referred to as SoftMap). These operations can be defined by the following mathematical equations (4) and (5).

$$e_j = N_j \cdot X_j \quad (4)$$

$$\text{SoftMap} = e_1 + e_2 + \ldots + e_j \quad (5)$$

The soft estimate SoftMap represents the best estimate in the sense that it minimizes the energy of the difference to the actual signal component (e.g., interfering signal) which is unknown.

The operations described above in relation to FIG. 8 can be modified to improve computational efficiency. For example, the exponential function of block 802 can be simplified by ignoring terms that are common to all j computations. This leads to a correlation followed by an exponential look-up.

Figure 9:
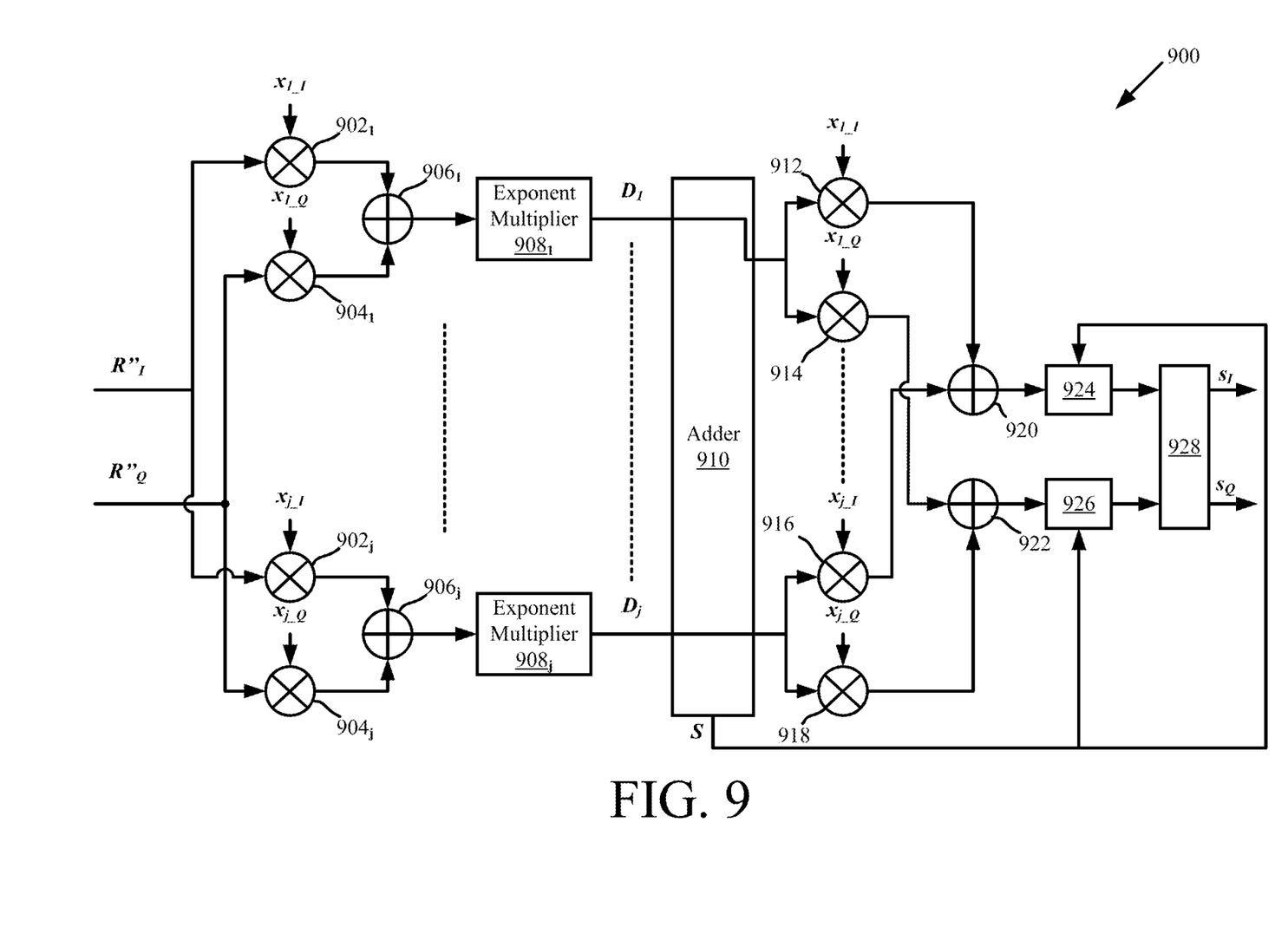

Another illustrative architecture for a soft decision operator 900 is shown in FIG. 9. Soft decision operator 706 of FIG. 7 can be the same as or similar to soft decision operator 900. Thus, the discussion of soft decision operator 800 is sufficient for understanding operations of soft decision operator 706 of FIG. 7. Soft decision operator 900 is discussed below in relation to an 8PSK scenario. The present solution is not limited in this regard. The architecture of FIG. 9 can be modified for use with other types of modulation (e.g., 16PSK, etc.).

As shown in FIG. 9, soft decision operator 900 comprises multipliers $902_1, \ldots, 902_j, 904_1, \ldots, 902_j, 912, 914, 916, 918$, adders $906_1, \ldots, 906_j, 910, 920, 922$, exponent multipliers $908_1, \ldots, 908_j$, multiplication/division operators 624, 626 and an amplitude scale Look Up Table (LUT) operator 628. The operations of block 910 are the same as or similar to the operations of blocks 804 and 806 of FIG. 8. The operations of blocks 912-928 are the same as or similar to the operations of blocks 808 and 810 of FIG. 8. Both I and Q lines are shown in FIG. 9. This illustrates that all the I terms and the Q terms are added separately for each of the possible symbol values $X_1, \ldots, X_j$. It should be noted that the operations of block 806 (i.e., division by the sum operations) has been moved in FIG. 9 to blocks 924, 926 which reside after the summation operations of adders 920, 922. This modification allows for an implementation with a single division circuit rather than a plurality of division circuits (e.g., 16 division circuits for 8PSK). It should also be noted that adders 920, 922 each have j inputs (e.g., 8 inputs in the 8PSK scenario).

Figure 10:
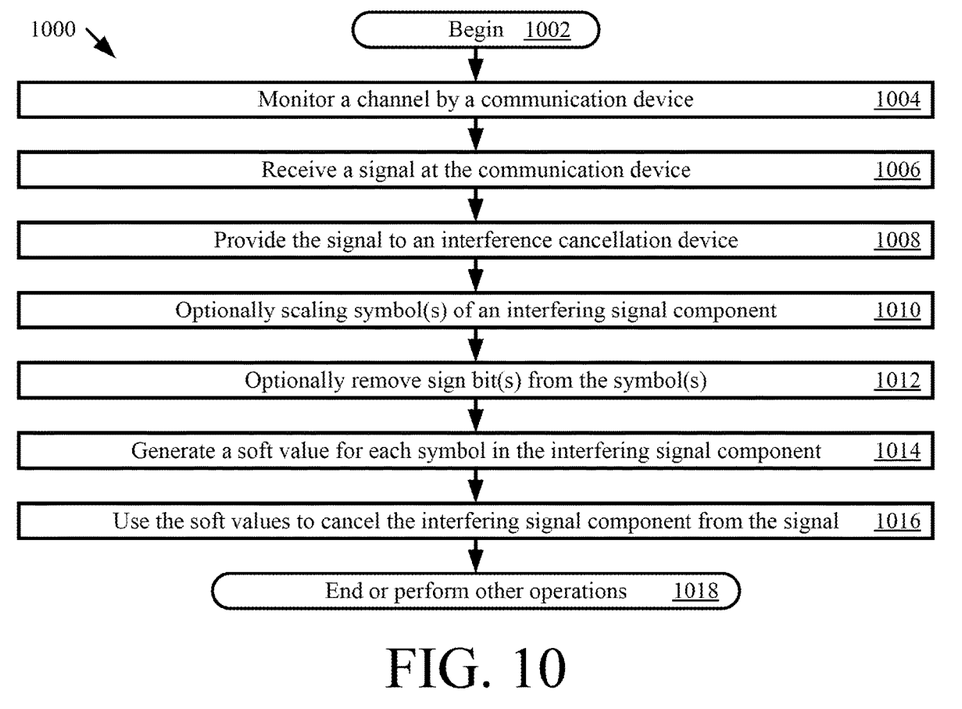
FIGS. 10-11 provide flow diagrams of an illustrative method for mitigating interference.

Referring now to FIG. 10, there is provided a method 1000 for mitigating interference. Method 1000 implements the process described above in relation to FIGS. 5-9. Method 1000 begins with 1002 and continues with 1004 where a communication device (e.g., communication device 204 or 206 of FIG. 1) performs operations to monitor a communications channel (e.g., a satellite communication channel). Methods for monitoring communication channels are well known in the art. The communication device receives a signal (e.g., signal R of FIG. 5) in 1006. Methods for receiving signals are well known in the art.

In 1008, the received signal is provided to an interference cancellation device (e.g., interference cancellation device 412 of FIG. 4). The interference cancellation device may be provided in a receiver (e.g., receiver 400 of FIG. 4) of the communication device. At the interference cancellation device, operations may optionally be performed in 1010 to scale symbol(s) of an interfering signal component in the received signal. Sign bit(s) may also be removed from the symbol(s) as shown by 1012.

The scaling may comprises combining the symbol with the scale value. The scale value is generated by: performing hard symbol decoding to generate a hard symbol value for the symbol; determining a measure of noise variance in the signal received by the device using the hard symbol value; and using the measure of noise variance to derive the scale value. The measure of noise variance may be determined by multiplying the hard symbol value by the actual symbol value. The scale value may be derived by: generating an estimate noise power for the signal received by the device based on the measure of noise variance; and computing a running average of the estimate noise power over a given period of time. The estimate noise power may be generated by squaring a product from multiplying the hard symbol value by the actual symbol value.

In 1014, a soft value is generated for each symbol in the interfering signal component. The manner in which the soft values are generated will be discussed in detail below in relation to FIG. 11. The soft values are then used in 1016 to cancel the interfering signal component from the received signal for mitigating the effect of interference.

Figure 11:
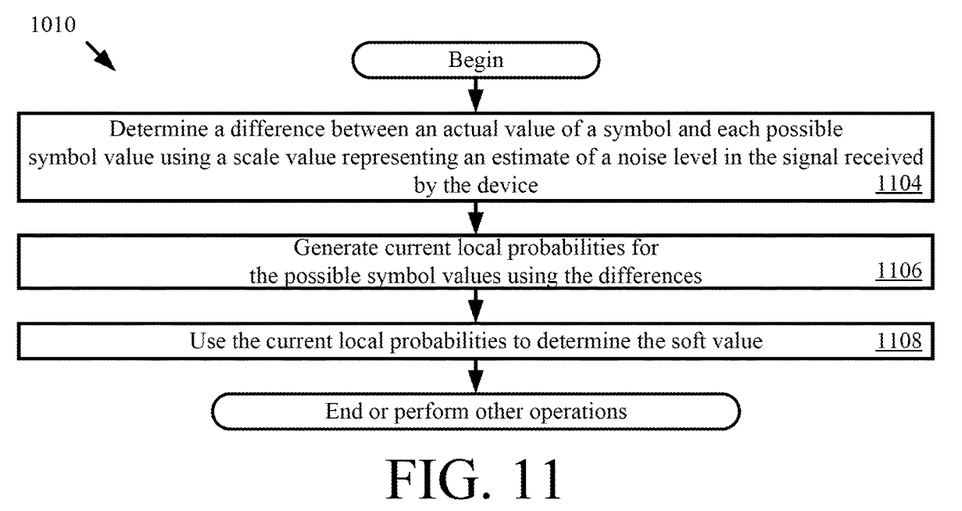

As shown in FIG. 11, each soft value is generated in block 1010 by: (1104) determining a difference between an actual value of the symbol and each of a plurality of possible symbol values using a scale value representing an estimate of the noise level in the signal received by the device; (1106) generating current local probabilities for the plurality of possible symbol values using the differences; and (1108) using the current local probabilities to determine the soft value. The difference may be defined by the above provided mathematical equation (1). Each current local probability may be generated by dividing the probability metrics by their sum. 1108 can involve: respectively multiplying each possible symbol value by a respective one of the current local probabilities to produce a value; and computing a sum of the values.

Figure 12:
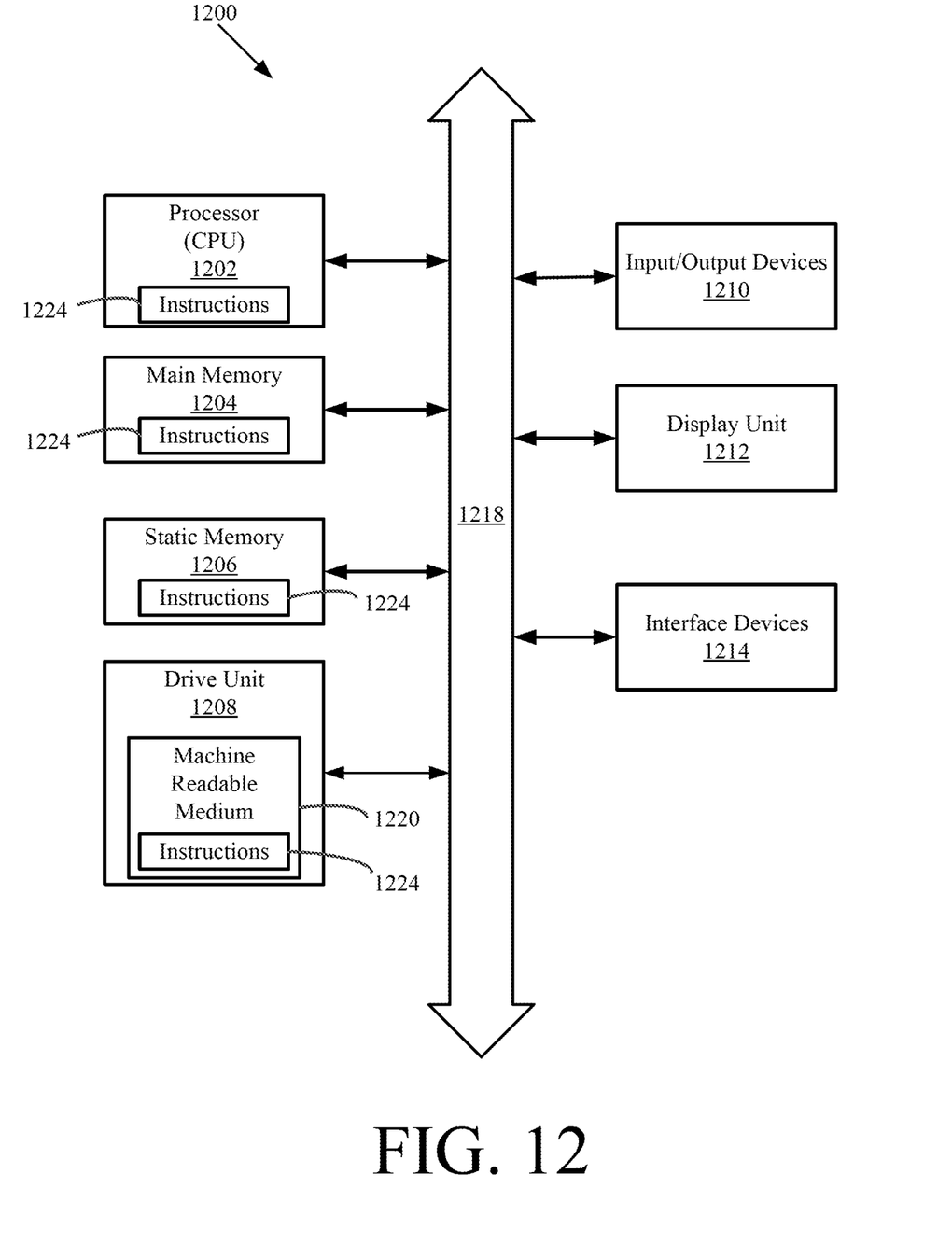
FIG. 12 provides an illustration of an architecture for a computing device.

Referring now to FIG. 12, there is shown a hardware block diagram comprising an example computer system 1200 that can be used for implementing all or part of the interference cancellation device 412 of FIG. 4. The machine can include a set of instructions which are used to cause the circuit/computer system to perform any one or more of the methodologies discussed herein. While only a single machine is illustrated in FIG. 12, it should be understood that in other scenarios the system can be taken to involve any collection of machines that individually or jointly execute one or more sets of instructions as described herein.

The computer system 1200 is comprised of a processor 1202 (e.g., a Central Processing Unit (CPU)), a main memory 1204, a static memory 1206, a drive unit 1208 for mass data storage and comprised of machine readable media 1220, input/output devices 1210, a display unit 1212 (e.g., a Liquid Crystal Display (LCD) or a solid state display, and one or more interface devices 1214. Communications among these various components can be facilitated by means of a data bus 1218. One or more sets of instructions 1224 can be stored completely or partially in one or more of the main memory 1204, static memory 1206, and drive unit 1208. The instructions can also reside within the processor 1202 during execution thereof by the computer system. The input/output devices 1210 can include a keyboard, a multi-touch surface (e.g. a touchscreen) and so on. The interface device(s) 1214 can be comprised of hardware components and software or firmware to facilitate an interface to external circuitry. For example, in some scenarios, the interface devices 1214 can include one or more Analog-to-Digital (A/D) converters, Digital-to-Analog (D/A) converters, input voltage buffers, output voltage buffers, voltage drivers and/or comparators. These components are wired to allow the computer system to interpret signal inputs received from external circuitry, and generate the necessary control signals for certain operations described herein.

The drive unit 1208 can comprise a machine readable medium 1220 on which is stored one or more sets of instructions 1224 (e.g. software) which are used to facilitate one or more of the methodologies and functions described herein. The term "machine-readable medium" shall be understood to include any tangible medium that is capable of storing instructions or data structures which facilitate any one or more of the methodologies of the present disclosure. Exemplary machine-readable media can include solid-state memories, Electrically Erasable Programmable Read-Only Memory (EEPROM) and flash memory devices. A tangible medium as described herein is one that is non-transitory insofar as it does not involve a propagating signal.

Computer system 1200 should be understood to be one possible example of a computer system which can be used in connection with the various implementations disclosed herein. However, the systems and methods disclosed herein are not limited in this regard and any other suitable computer system architecture can also be used without limitation. Dedicated hardware implementations including, but not limited to, application-specific integrated circuits, programmable logic arrays, and other hardware devices can likewise be constructed to implement the methods described herein. Applications that can include the apparatus and systems broadly include a variety of electronic and computer systems. Thus, the exemplary system is applicable to software, firmware, and hardware implementations.

Further, it should be understood that embodiments can take the form of a computer program product on a tangible computer-usable storage medium (for example, a hard disk or a CD-ROM). The computer-usable storage medium can have computer-usable program code embodied in the medium. The term computer program product, as used herein, refers to a device comprised of all the features enabling the implementation of the methods described herein. Computer program, software application, computer software routine, and/or other variants of these terms, in the present context, mean any expression, in any language, code, or notation, of a set of instructions intended to cause a system having an information processing capability to perform a particular function either directly or after either or both of the following: a) conversion to another language, code, or notation; or b) reproduction in a different material form.

The described features, advantages and characteristics disclosed herein may be combined in any suitable manner. One skilled in the relevant art will recognize, in light of the description herein, that the disclosed systems and/or methods can be practiced without one or more of the specific features. In other instances, additional features and advantages may be recognized in certain scenarios that may not be present in all instances.

As used in this document, the singular form "a", "an", and "the" include plural references unless the context clearly dictates otherwise. Unless defined otherwise, all technical and scientific terms used herein have the same meanings as commonly understood by one of ordinary skill in the art. As used in this document, the term "comprising" means "including, but not limited to".

Although the systems and methods have been illustrated and described with respect to one or more implementations, equivalent alterations and modifications will occur to others skilled in the art upon the reading and understanding of this specification and the annexed drawings. In addition, while a particular feature may have been disclosed with respect to only one of several implementations, such feature may be combined with one or more other features of the other implementations as may be desired and advantageous for any given or particular application. Thus, the breadth and scope of the disclosure herein should not be limited by any of the above descriptions. Rather, the scope of the invention should be defined in accordance with the following claims and their equivalents.

We claim:

1. A method for mitigating an effect of interference, comprising:
    receiving, by a device, a signal comprising at least one interfering signal component;
    generating, by the device, a soft value for each symbol in the at least one interfering signal component, the soft value representing a most likely value for the symbol which is obtained by
        determining a probability metric between an actual value of the symbol and each of a plurality of possible symbol values using a scaling value representing an estimate of a noise level in the signal received by the device,
generating current local probabilities for the plurality of possible symbol values using the probability metric, and
using the current local probabilities to determine the soft value; and
using, by the device, the soft values to cancel the at least one interfering signal component from the signal to mitigate the effect of interference.

2. The method according to claim 1, further comprising scaling said symbol of the at least one interfering signal component and removing sign bits from said symbol, prior to generating the soft value, exploiting symmetries in the signal set for the purpose of reducing computational effort.

3. The method according to claim 2, wherein the scaling comprises combining said symbol with the scaling value.

4. The method according to claim 1, wherein the scaling value is derived by:
generating an estimate noise power for the signal received by the device based on a measure of noise variance; and
computing a running average of the estimate noise power over a given period of time.

5. The method according to claim 4, wherein the estimate noise power is generated by squaring a difference between a hard symbol value by the actual symbol value.

6. The method according to claim 1, wherein the scaling value is generated by:
performing hard symbol decoding to generate a hard symbol value for the symbol;
determining a measure of noise variance in the signal received by the device using the hard symbol value; and
using the measure of noise variance to derive the scaling value.

7. The method according to claim 6, wherein the measure of noise variance is determined by subtracting the hard symbol value by the actual symbol value.

8. The method according to claim 1, wherein the probability metric is defined by the mathematical equation $\exp((-|y_j-x_j|(2)/2\sigma^2)$, $y_j$ is a pair of coordinate values for the received signal, $x_j$ is a pair of coordinate values for a possible signal point in a constellation, and $\sigma^2$ is the scaling value.

9. The method according to claim 1, wherein each of the current local probabilities is generated by dividing the probability metric by a sum of the current local probabilities.

10. The method according to claim 1, wherein the using comprises (i) respectively multiplying each said possible symbol value by a respective one of the current local probabilities to produce a value and (ii) computing a sum of the values.

11. A system, comprising:
a processor;
a non-transitory computer-readable storage medium comprising programming instructions that are configured to cause the processor to implement a method for mitigating an effect of interference, wherein the programming instructions comprise instructions to:
receive a signal comprising at least one interfering signal component;
generate a soft value for each symbol in the at least one interfering signal component, the soft value representing a most likely value for the symbol which is obtained by
determining a probability metric between an actual value of the symbol and each of a plurality of possible symbol values using a scaling value representing an estimate of a noise level in the signal received by a device,
generating current local probabilities for the plurality of possible symbol values using the probability metric, and
using the current local probabilities to determine the soft value; and
use the soft values to cancel the at least one interfering signal component from the signal to mitigate the effect of interference.

12. The system according to claim 11, wherein the scaling value is generated by:
performing hard symbol decoding to generate a hard symbol value for the symbol;
determining a measure of noise variance in the signal received by the device using the hard symbol value; and
using the measure of noise variance to derive the scaling value.

13. The system according to claim 12, wherein the programming instructions further comprise instructions to scale said symbol of the at least one interfering signal component and remove sign bits from said symbol, prior to generating the soft value.

14. The system according to claim 13, wherein the scaling comprises combining said symbol with the scaling value.

15. The system according to claim 12, wherein the measure of noise variance is determined by subtracting the hard symbol value by the actual symbol value.

16. The system according to claim 11, wherein the scaling value is derived by:
generating an estimate noise power for the signal received by the device based on a measure of noise variance; and
computing a running average of the estimate noise power over a given period of time.

17. The system according to claim 16, wherein the estimated noise power is generated by squaring a difference between a hard symbol value by the actual symbol value.

18. The system according to claim 11, wherein the probability metric is defined by the mathematical equation $\exp((-|y_j-x_j|^2)/2\sigma^2)$, $y_j$ is a pair of coordinates for the received signal, $x_j$ is a pair of coordinates for a possible signal point in a constellation, and $\sigma^2$ is the scaling value.

19. The system according to claim 11, wherein each of the current local probabilities is generated by dividing the probability metric by a sum of the current local probabilities.

20. The system according to claim 11, wherein the using comprises (i) respectively multiplying each said possible symbol value by a respective one of the current local probabilities to produce a value and (ii) computing a sum of the values.

* * * * *